United States Patent
Watanabe et al.

(10) Patent No.: US 8,122,382 B2
(45) Date of Patent: Feb. 21, 2012

(54) TELEVISION BROADCAST RECEIVER

(75) Inventors: Hideaki Watanabe, Shijonawate (JP);
Kiyoshi Awano, Hirakata (JP)

(73) Assignee: SANYO Electric Co., Ltd.,
Moriguchi-shi (JP)

(*) Notice: Subject to any disclaimer, the term of this patent is extended or adjusted under 35 U.S.C. 154(b) by 0 days.

(21) Appl. No.: 11/715,330

(22) Filed: Mar. 8, 2007

(65) Prior Publication Data

US 2007/0214435 A1 Sep. 13, 2007

(30) Foreign Application Priority Data

Mar. 10, 2006 (JP) .................................. 2006-065130

(51) Int. Cl.
*G06F 3/048* (2006.01)
(52) U.S. Cl. .......................................... 715/854; 725/52
(58) Field of Classification Search .................. 715/854, 715/712–713, 705, 740; 725/38, 52, 37
See application file for complete search history.

(56) References Cited

U.S. PATENT DOCUMENTS

| | | | | |
|---|---|---|---|---|
| 5,818,935 | A * | 10/1998 | Maa ............................... | 380/200 |
| 5,936,611 | A | 8/1999 | Yoshida | |
| 5,999,167 | A * | 12/1999 | Marsh et al. ................... | 345/158 |
| 6,336,123 | B2 * | 1/2002 | Inoue et al. .................... | 715/206 |
| 2002/0021373 | A1 * | 2/2002 | Shibamiya .................... | 348/734 |
| 2002/0113895 | A1 * | 8/2002 | Takagi et al. ................. | 348/569 |
| 2002/0157092 | A1 * | 10/2002 | Kitsukawa et al. ................ | 725/9 |
| 2002/0157098 | A1 * | 10/2002 | Zustak et al. ................... | 725/51 |
| 2002/0157100 | A1 * | 10/2002 | Kitsukawa et al. ............. | 725/56 |
| 2002/0157107 | A1 * | 10/2002 | Kitsukawa et al. ........... | 725/109 |
| 2004/0189827 | A1 | 9/2004 | Kim et al. | |
| 2004/0207764 | A1 * | 10/2004 | Naoi et al. ..................... | 348/732 |

(Continued)

FOREIGN PATENT DOCUMENTS

| | | |
|---|---|---|
| CN | 1538444 A | 10/2004 |
| JP | 08-065587 A | 3/1996 |
| JP | 09-130695 A | 5/1997 |
| JP | 2000-207091 A | 7/2000 |
| JP | 2004-274600 A | 9/2004 |
| JP | 2005-197991 A | 7/2005 |

OTHER PUBLICATIONS

Chinese Office Action dated Mar. 10, 2010, issued in corresponding Chinese Patent Application No. 2007-10088638.5.

*Primary Examiner* — William Bashore
*Assistant Examiner* — Meseker Takele
(74) *Attorney, Agent, or Firm* — Westerman, Hattori, Daniels & Adrian, LLP (57) ABSTRACT

A television broadcast receiver has an operation section including up, down, left, and right cursor keys and a function of displaying an operation guide composed of contents of a plurality of pages. In the television broadcast receiver, in a state in which contents of an arbitrary page among the contents of the plurality of pages composing the operation guide are displayed, a function as a key for changing a displayed page to a previous page is assigned to a first key which is one of the up, down, left, and right cursor keys, and a function as a key for changing the displayed page to a next page is assigned to a second key which is one of the up, down, left, and right cursor keys and which is other than the first key.

2 Claims, 6 Drawing Sheets

U.S. PATENT DOCUMENTS

| | | |
|---|---|---|
| 2005/0156818 A1 | 7/2005 | Tsuji |
| 2005/0183038 A1* | 8/2005 | Yamamoto et al. ............ 715/838 |
| 2005/0223339 A1* | 10/2005 | Lee ............................... 715/825 |
| 2006/0007306 A1* | 1/2006 | Masters et al. ................. 348/114 |
| 2006/0059231 A1* | 3/2006 | Takatori et al. ................ 709/206 |
| 2006/0080705 A1* | 4/2006 | Miyazawa ....................... 725/37 |
| 2006/0259945 A1* | 11/2006 | Kimura et al. ................. 725/151 |
| 2007/0214434 A1* | 9/2007 | Rydenhag ..................... 715/854 |

\* cited by examiner

TELEVISION BROADCAST RECEIVER

BACKGROUND OF THE INVENTION

1. Field of the Invention

The present invention relates to a television broadcast receiver.

2. Description of the Related Art

In a digital television broadcast receiver, when selecting a selection item on a menu, it is common practice to perform an operation of tentatively selecting a desired item using up, down, left, and right cursor keys on a remote control transmitter and then pressing a determination key on the remote control transmitter.

Some of digital television broadcast receivers have a function of displaying a receiver operation guide for explaining a setting method, a recording method, and the like. In many cases, such a receiver operation guide is normally composed of contents of a plurality of pages for each item. Thus, to view an operation guide for a single item, an operation for changing pages needs to be performed. To change pages, there is a need to take two actions such as pressing a left or right cursor key and then pressing a determination key, for example.

Also, there is a receiver having a function of reproducing and outputting audio guidance for explaining contents of a receiver operation guide. In such a receiver, a key for inputting an audio guidance reproduction instruction may be assigned to a color key (a blue, green, red, or yellow key).

SUMMARY OF THE INVENTION

A first television broadcast receiver of the present invention comprises an operation section including up, down, left, and right cursor keys and a function of displaying an operation guide composed of contents having of a plurality of pages. In a state in which contents of an arbitrary page among the contents having a plurality of pages composing the operation guide are displayed, a function as a key for changing a displayed page to a previous page is assigned to a first key which is one of the up, down, left, and right cursor keys, and a function as a key for changing the displayed page to a next page is assigned to a second key which is one of the up, down, left, and right cursor keys and which is other than the first key.

A second television broadcast receiver of the present invention comprises an operation section including up, down, left, and right cursor keys and a function of displaying an operation guide composed of contents of a plurality of pages. In a state in which among the contents of a plurality of pages composing the operation guide, contents of a page(s) other than a last page are displayed, a function as a key for changing a displayed page to a previous page is assigned to a first key which is one of the up, down, left, and right cursor keys, and a function as a key for changing the displayed page to a next page is assigned to a second key which is one of the up, down, left, and right cursor keys and which is other than the first key. In a state in which contents of the last page are displayed, a function as a key for changing a displayed page to a previous page is assigned to a first key which is one of the up, down, left, and right cursor keys, and a function as a key for transitioning to a screen for actually performing an operation which is explained in the operation guide is assigned to a second key which is one of the up, down, left, and right cursor keys and which is other than the first key.

A third television broadcast receiver of the present invention comprises an operation section including up, down, left, and right cursor keys, a function of displaying an operation guide composed of contents of a plurality of pages, and a function of reproducing audio guidance corresponding to contents of each page. In a state in which contents of an arbitrary page among the contents of the plurality of pages composing the operation guide are displayed, a function as a key for changing a displayed page to a previous page is assigned to a first key which is one of the up, down, left, and right cursor keys, a function as a key for changing the displayed page to a next page is assigned to a second key which is one of the up, down, left, and right cursor keys and which is other than the first key, and a function as a key for reproducing audio guidance is assigned to a third key which is one of the up, down, left, and right cursor keys and which is other than the first key and the second key.

A fourth television broadcast receiver of the present invention comprises an operation section including up, down, left, and right cursor keys, a function of displaying an operation guide composed of contents of a plurality of pages, and a function of reproducing audio guidance corresponding to contents of each page. In a state in which among the contents of the plurality of pages composing the operation guide, contents of a page(s) other than a last page are displayed, a function as a key for changing a displayed page to a previous page is assigned to a first key which is one of the up, down, left, and right cursor keys, a function as a key for changing the displayed page to a next page is assigned to a second key which is one of the up, down, left, and right cursor keys and which is other than the first key, and a function as a key for reproducing audio guidance is assigned to a third key which is one of the up, down, left, and right cursor keys and which is other than the first key and the second key. In a state in which contents of the last page are displayed, a function as a key for changing a displayed page to a previous page is assigned to a first key which is one of the up, down, left, and right cursor keys, a function as a key for reproducing audio guidance is assigned to a second key which is one of the up, down, left, and right cursor keys and which is other than the first key, and a function as a key for transitioning to a screen for actually performing an operation which is explained in the operation guide is assigned to a third key which is one of the up, down, left, and right cursor keys and which is other than the first key and the second key.

DESCRIPTION OF THE PREFERRED EMBODIMENTS

An embodiment of the present invention will be described below with reference to the drawings.

Figure 1:
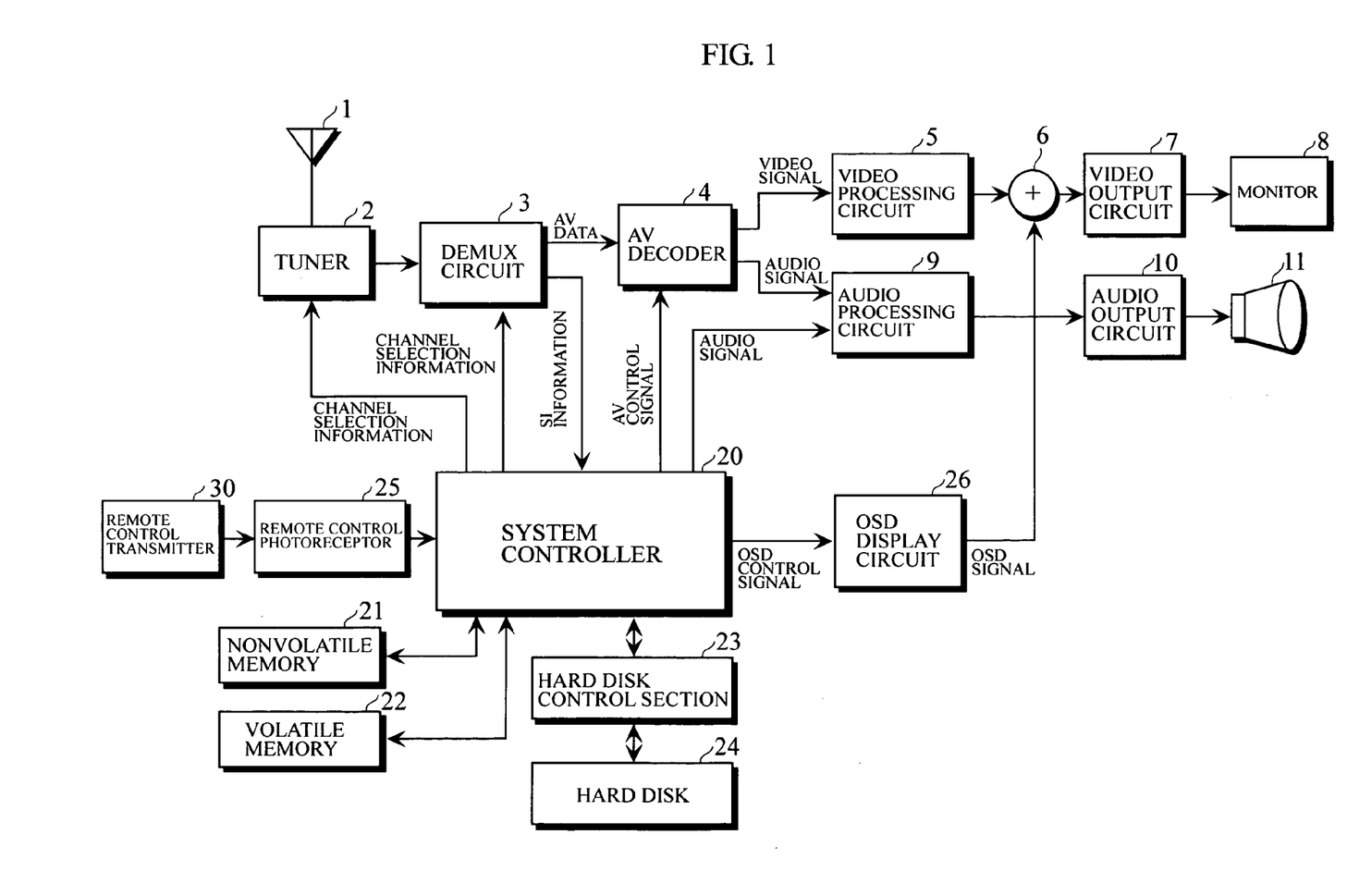
FIG. 1 is a block diagram showing the configuration of a digital television broadcast receiver.

FIG. 1 shows the configuration of a digital television broadcast receiver.

A broadcast wave is transmitted to a tuner 2 via an antenna 1 and a high-frequency process and demodulation are performed. An output from the tuner 2 is transmitted to a DEMUX circuit 3 and decoding of packets is performed. In the DEMUX circuit 3, packets are separated into AV data which is program content itself and service information (SI information). The AV data obtained by the DEMUX circuit 3 is transmitted to an AV decoder 4. The SI information obtained by the DEMUX circuit 3 is transmitted to a system controller 20.

The system controller 20 includes a nonvolatile memory (program memory) 21 having stored therein a program and the like, and a volatile memory 22 that stores therein necessary data. The system controller 20 stores in the volatile memory 22 the SI information transmitted from the DEMUX circuit 3. A hard disk 24 is connected to the system controller 20 via a hard disk control section 23.

The hard disk 24 stores video and audio data on recorded programs, various HTML content data, audio guidance data, and the like. A remote control signal (operation information) from a remote control transmitter 30 is inputted to the system controller 20 via a remote control photoreceptor 25.

The system controller 20 transmits information for channel selection, or the like, to the tuner 2 and the DEMUX circuit 3. In addition, the system controller 20 transmits an AV control signal for controlling the AV decoder 4 to the AV decoder 4.

The system controller 20 transmits to an OSD display circuit 26 an OSD control signal for on-screen displaying on a monitor 8 a program guide (EPG), various setting screens, and various operation guide screens. The OSD display circuit 26 generates display data (on-screen display screen data) such as the program guide (EPG), various setting screens, various operation guide screens, and the like, and transmits the display data to a multiplexer 6 as an OSD signal.

The AV decoder 4 decodes the AV data transmitted from the DEMUX circuit 3. An audio signal obtained by the AV decoder 4 is transmitted to a speaker 11 via an audio processing circuit 9 and an audio output circuit 10. A video signal obtained by the AV decoder 4 is transmitted to the multiplexer 6 via a video processing circuit 5.

The multiplexer 6 performs a process of superimposing the display data transmitted from the OSD display circuit 26 on video data outputted from the video processing circuit 5 and transmits the superimposed data to a video output circuit 7. A video signal outputted from the video output circuit 7 is transmitted to the monitor 8.

The digital television broadcast receiver has a function of displaying on the monitor a receiver operation guide for explaining an operation method for the receiver. The receiver operation guide is composed of contents created in HTML format and stored on the hard disk 24.

Figure 2:
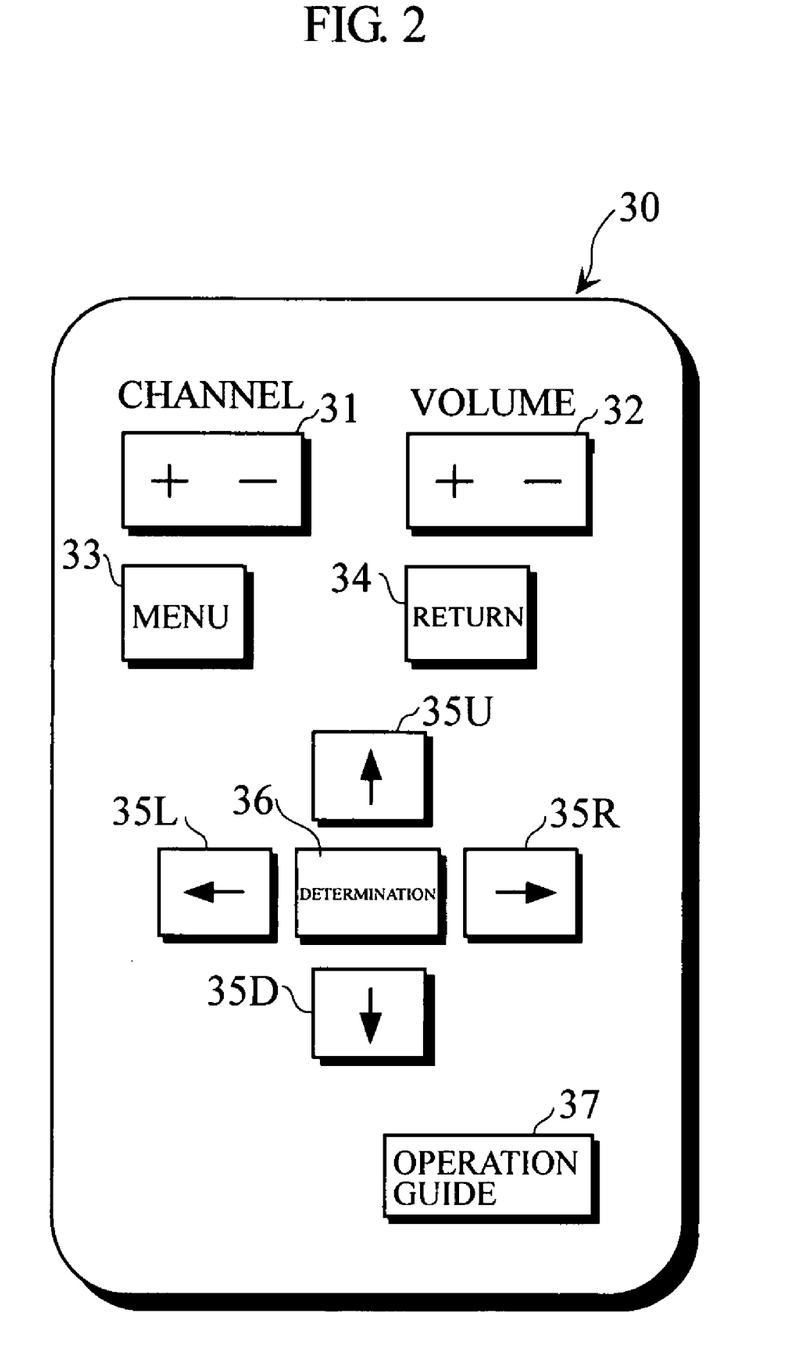
FIG. 2 is a schematic diagram showing part of a remote control transmitter 30.

FIG. 2 shows part of the remote control transmitter 30.

The remote control transmitter 30 has an up/down key 31 for channel changing, an up/down key 32 for volume control, a Menu button 33, a return button 34, up, down, left, and right cursor keys 35U, 35D, 35L, and 35R, a determination key 36, an operation guide key 37, and the like.

When the operation guide key 37 on the remote control transmitter 30 is depressed, operation information corresponding to the operation guide key 37 is inputted to the system controller 20. When the operation information corresponding to the operation guide key 37 is inputted to the system controller 20, the system controller 20 requests the hard disk control section 23 to obtain HTML content data corresponding to an index page for a receiver operation guide. The hard disk control section 23 obtains the corresponding HTML content data from the hard disk 24 and provides the HTML content data to the system controller 20.

The system controller 20 converts the obtained HTML content data into data in a displayable format and transmits the data to the OSD display circuit 26 as an OSD control signal. The OSD display circuit 26 generates, based on the OSD control signal, on-screen display screen data and transmits the data to the multiplexer 6 as an OSD signal.

The multiplexer 6 performs a process of superimposing the on-screen display screen data transmitted from the OSD display circuit 26 on video data outputted from the video processing circuit 5 and transmits the superimposed data to the video output circuit 7. A video signal outputted from the video output circuit 7 is transmitted to the monitor 8.

Figure 3:
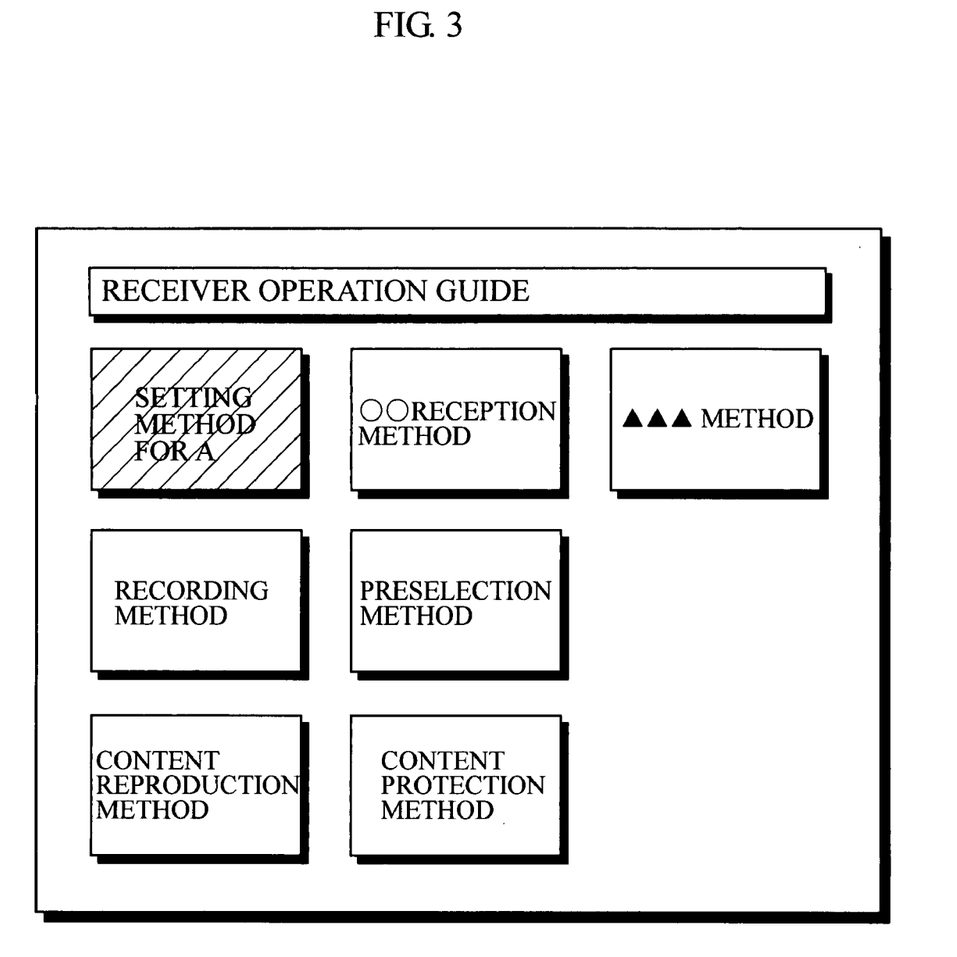
FIG. 3 is a schematic diagram showing an exemplary index page for a receiver operation guide to be displayed on a monitor 8 when an operation guide key 37 is depressed.

FIG. 3 shows an exemplary index page for a receiver operation guide to be displayed on the monitor 8 when the operation guide key 37 is depressed.

On the index page for the receiver operation guide, a plurality of items which are operation guide targets are displayed as selection items. A user first tentatively selects an item for which the user wants to know about an operation method, using the up, down, left, and right cursor keys 35U, 35D, 35L, and 35R. By the tentatively selected item being highlight displayed, the user can see which item is tentatively selected. Then, by depressing the determination key 36, the first page of operation explanation corresponding to the tentatively selected item is displayed.

Note that it is assumed that operation explanation corresponding to each item is composed of a plurality of pages. Note also that audio guidance is prepared for each page of operation explanation and thus audio guidance can be reproduced and outputted based on an instruction from the user.

Here, the case will be described in which an item "setting method for A" is selected from among the items displayed on the index page.

Figure 4:
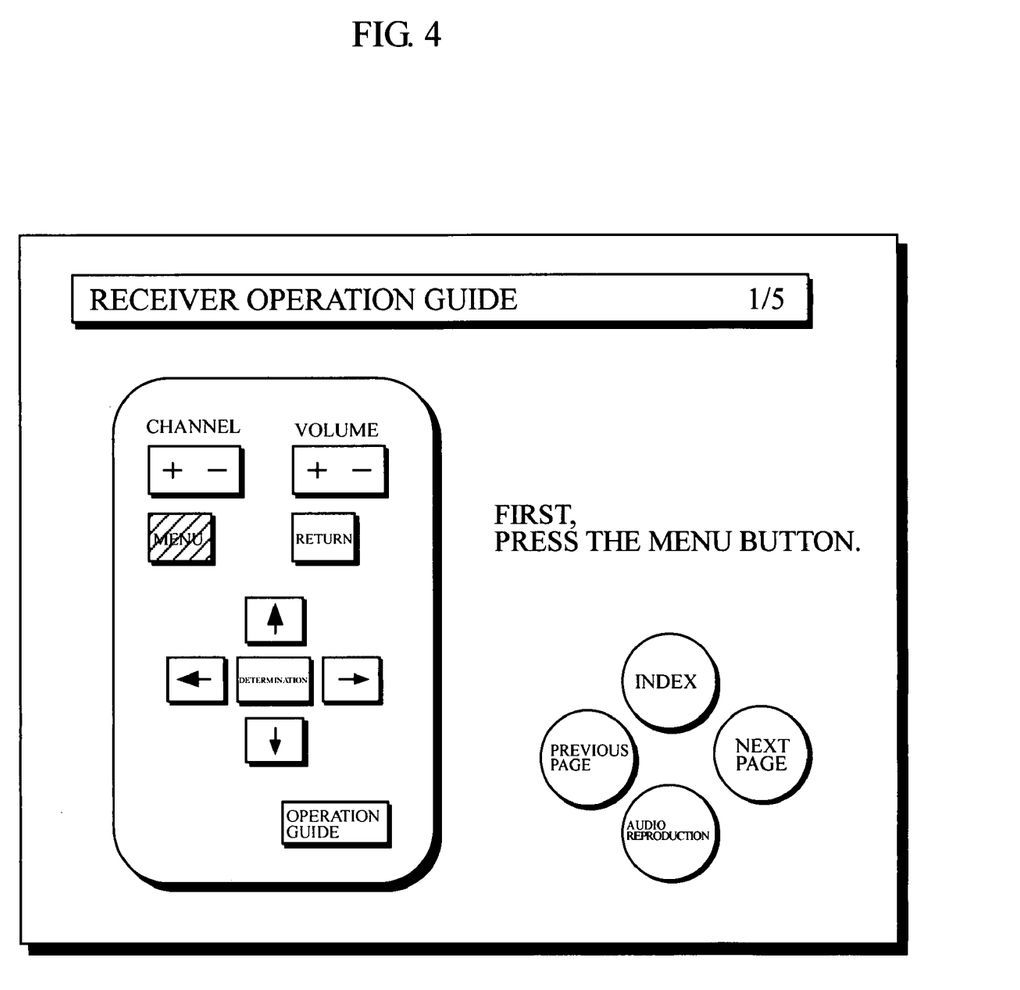
FIG. 4 is a schematic diagram showing exemplary contents of the first page of operation explanation of an item "setting method for A"

When the item "setting method for A" is selected, as shown in FIG. 4, contents of the first page of an operation guide for the item are displayed. Note that the operation guide for "setting method for A" is composed of contents of five pages. In exemplary contents in FIG. 4, operation explanation is provided by a schematic diagram showing the keys on the remote control transmitter 30 and a caption "first, press the Menu button".

At the lower right of the contents in FIG. 4, functions assigned to the up, down, left, and right cursor keys 35U, 35D, 35L, and 35R are shown by a schematic diagram. Specifically, four circles corresponding to dispositions of the up, down, left, and right cursor keys, respectively, are displayed and the functions assigned to the cursor keys are described in their corresponding circles.

In this example, a function as a key for changing a displayed page to a previous page is assigned to the left cursor key 35L, a function as a key for changing the displayed page to a next page is assigned to the right cursor key 35R, a function as a key for changing the displayed page to the index page is assigned to the up cursor key 35U, and a function as a key for inputting an audio reproduction instruction is assigned to the down cursor key 35D.

Note that which function is assigned to which cursor key is predetermined for each page of the operation guide and information on the assignment is reflected to HTML content data on each page and a program in the system controller 20.

When, in a state shown in FIG. 4 in which the contents of the first page are displayed, the left cursor key 35L on the remote control transmitter 30 is depressed, a previous page, i.e., the index page in this case, is displayed. When the right cursor key 35R on the remote control transmitter 30 is depressed, a next page, the second page in this case, is displayed. When the up cursor key 35U on the remote control transmitter 30 is depressed, the index page is displayed.

When the down cursor key 35D on the remote control transmitter 30 is depressed, audio guidance corresponding to the present page is reproduced and outputted. Specifically, when the down cursor key 35D on the remote control transmitter 30 is depressed, the system controller 20 requests the hard disk control section 23 to obtain corresponding audio guidance data.

The hard disk control section 23 obtains the corresponding audio guidance data from the hard disk 24 and provides the data to the system controller 20. The system controller 20 converts the obtained audio guidance data into an audio signal and transmits the audio signal to the audio processing circuit 9. The audio signal transmitted to the audio processing circuit 9 is outputted as sound from the speaker 11 via the audio processing circuit 9 and the audio output circuit 10.

The operation guide for "setting method for A" is composed of contents of five pages; in contents of the first page through the fourth page, the functions assigned to the up, down, left, and right cursor keys 35U, 35D, 35L, and 35R, respectively, are the same on all pages.

Figure 5:
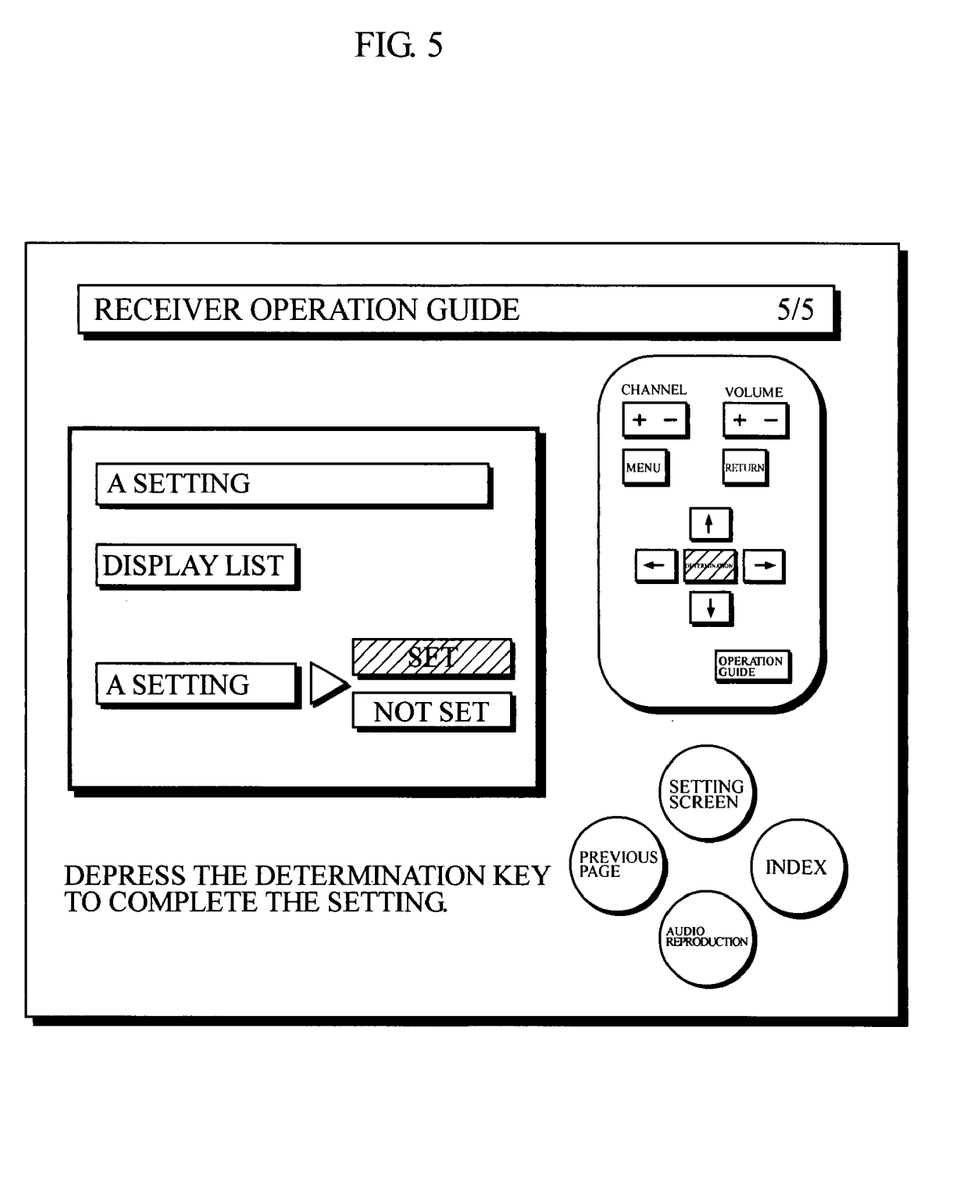
FIG. 5 is a schematic diagram showing exemplary contents of the fifth page which is the last page of the operation explanation of the item "setting method for A"

FIG. 5 shows contents of the fifth page which is the last page of the operation guide for "setting method for A".

In exemplary contents in FIG. 5, operation explanation is provided by a schematic diagram on the left side surrounded by a rectangular frame, a schematic diagram on the right side showing the keys on the remote control transmitter 30, and a caption "depress the determination key to complete the setting".

At the lower right of the contents in FIG. 5, the functions that are assigned to the up, down, left, and right cursor keys 35U, 35D, 35L, and 35R in the same manner as the first page are shown by a schematic diagram.

Since the contents in FIG. 5 are of the last page, a key for changing the displayed page to a next page is not necessary. Hence, in this example, a function as a key for changing the displayed page to a previous page is assigned to the left cursor key 35L, a function as a key for changing the displayed page to the index page is assigned to the right cursor key 35R, and a function as a key for inputting an audio reproduction instruction is assigned to the down cursor key 35D. A function as a key for transitioning to a menu screen (an actual setting screen corresponding to a setting screen displayed in the contents in FIG. 5) for actually performing an A setting explained in the operation guide is assigned to the up cursor key 35U.

Figure 6:
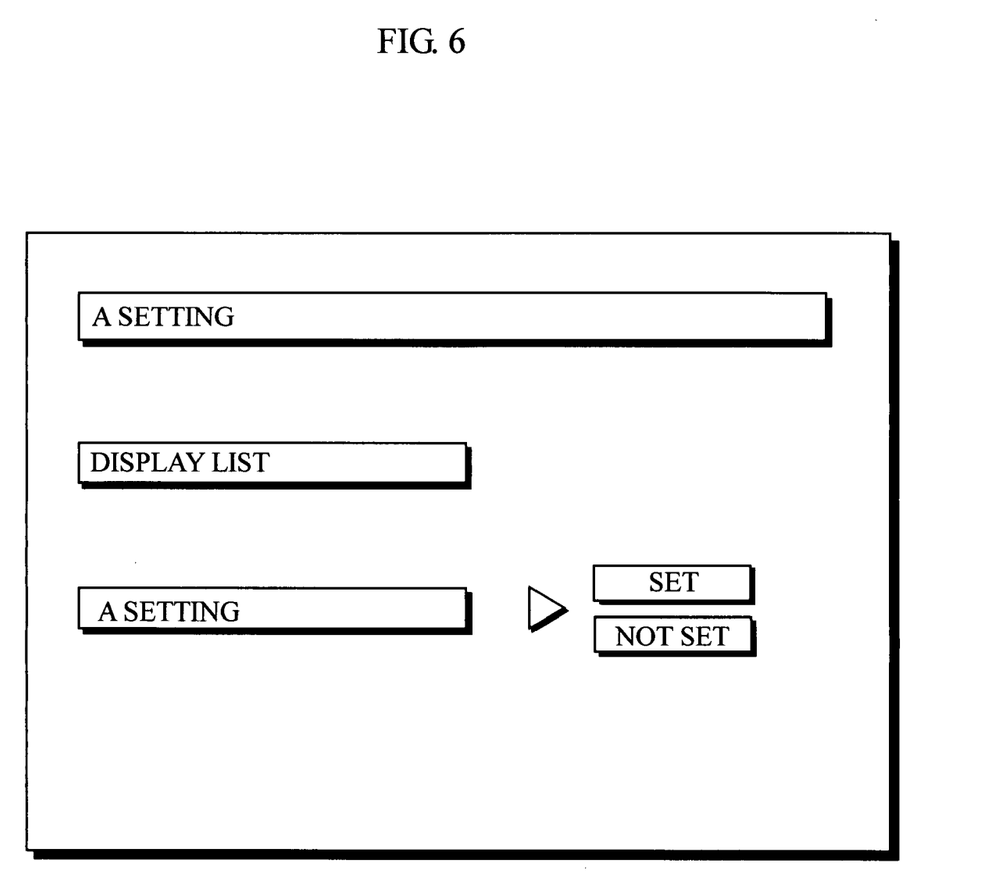
FIG. 6 is a schematic diagram showing a setting screen for actually performing a setting of A.

When, in a state shown in FIG. 5 in which the contents of the last page are displayed, the up cursor key 35U on the remote control transmitter 30 is depressed, the display screen is transitioned to a setting screen for actually performing the A setting, such as the one shown in FIG. 6.

According to the above-described embodiment, when browsing contents composed of a plurality of pages, such as a receiver operation guide, since changing of pages can be performed by a simple cursor key operation, a user can concentrate on understanding an operation method for an apparatus which is explained by contents and can learn the operation method in a short period of time.

In addition, since an audio guidance reproduction instruction can be inputted by a simple cursor key operation, operability is enhanced. Furthermore, by operating a predetermined cursor key in a state in which contents of the last page are displayed, the display screen can be transitioned to a menu screen (setting screen) for performing a setting, and the like, explained by the contents and thus the setting, and the like, explained by the contents can be easily performed.

What is claimed is:

1. A television broadcast receiver comprising: a monitor for displaying a received image; a remote control transmitter for operating said television broadcast receiver, having a plurality of operation keys including up, down, left, and right cursor keys for allowing a user to select a selection item on a menu;

a unit arranged to display operation guides for explaining various operation methods of the television broadcast receiver on the monitor, each of the operation guides being comprised of html contents of a plurality of pages, and wherein each of said plurality of pages include four figures corresponding to dispositions of the up, down, left, and right cursor keys in the remote control transmitter, respectively, letter strings associated with the respective figures, each of the letter strings describing a function assigned to the cursor key corresponding to each of the four figures, a schematic diagram showing dispositions of each key in the remote control transmitter, and a caption for explaining an operation method; and a unit arranged to reproduce audio guidance corresponding to html contents of each page, wherein in a state in which among the html contents of the plurality of pages comprising the operation guide for describing an operation method selected by the user from among various operation methods for the television broadcast receiver, html contents of a page other than a last page are displayed:

a unit arranged to change a displayed page to a previous page is assigned in a predetermined manner for each one of said plurality of pages to a first key which is one of the up, down, left, and right cursor keys, a unit arranged to change the displayed page to a next page is assigned in a predetermined manner for each one of said plurality of pages to a second key which is one of the up, down, left, and right cursor keys and which is other than the first key, and a unit arranged to reproduce audio guidance is assigned in a predetermined manner for each one of said plurality of pages to a third key which is one of the up, down, left, and right cursor keys and which is other than the first key and the second key, and in a state in which html contents of the last page are displayed:

a unit arranged to change a displayed page to a previous page is assigned in a predetermined manner to a first key which is one of the up, down, left, and right cursor keys, a unit arranged to reproduce audio guidance is assigned in a predetermined manner to a second key which is one of the up, down, left, and right cursor keys and which is other than the first key, and unit arranged to transition to a screen for performing an operation which is explained in the operation guide is assigned in a predetermined manner to a third key which is one of the up, down, left, and right cursor keys and which is other than the first key and the second key.

2. The television broadcast receiver according to claim 1, in which the operation guide is prepared for each of a plurality of items and the receiver further comprises a unit arranged to display an index screen for selecting which operation guide of items is displayed, wherein in a state in which html contents of an arbitrary page among html contents of a plurality of pages composing an operation guide are displayed, a unit arranged to transition to the index screen is assigned to one of the up, down, left, and right cursor keys.

\* \* \* \* \*